(12) United States Patent
Deutschel et al.

(10) Patent No.: US 6,186,258 B1
(45) Date of Patent: Feb. 13, 2001

(54) DYNAMIC ALL WHEEL DRIVE

(75) Inventors: Brian William Deutschel, Sterling Heights; Donald Graham Straitiff, Howell, both of MI (US)

(73) Assignee: General Motors Corporation, Detroit, MI (US)

( * ) Notice: Under 35 U.S.C. 154(b), the term of this patent shall be extended for 0 days.

(21) Appl. No.: 09/247,116

(22) Filed: Feb. 9, 1999

(51) Int. Cl.[7] .................................................. B60K 17/344
(52) U.S. Cl. ...................... 180/197; 180/233; 192/103 F; 192/87.13; 475/88; 475/93; 701/88; 701/89
(58) Field of Search ..................... 180/233, 247, 180/248, 197; 701/69, 82, 88, 89; 475/88, 90, 93, 94; 192/103 F, 87.12, 87.13

(56) References Cited

U.S. PATENT DOCUMENTS

| | | | |
|---|---|---|---|
| 5,162,024 | * 11/1992 | Yoshiba | 475/89 |
| 5,562,192 | * 10/1996 | Dick | 192/84.1 |
| 5,632,185 | * 5/1997 | Gassmann | 74/650 |
| 5,827,145 | * 10/1998 | Okcuoglu | 475/88 |
| 5,938,556 | * 8/1999 | Lowell | 475/89 |
| 6,056,658 | * 5/2000 | Illmeier | 475/88 |

FOREIGN PATENT DOCUMENTS

570841 * 11/1993 (EP) .................................. 192/103 F

* cited by examiner

Primary Examiner—Brian L. Johnson
Assistant Examiner—Avraham H. Lerner
(74) Attorney, Agent, or Firm—Charles E. Leahy

(57) ABSTRACT

An all wheel drive mechanism has a powertrain including an engine, transmission, front drive differential, a rear drive transfer gearing and a selectively operable rear drive mechanism. The rear drive mechanism has a housing, driven by the transfer gearing through a drive shaft. A pair of selectively engageable clutches, which are operable to connect the rear wheels to the housing, are disposed in the housing. A pair of pumps are assembled in the housing to provide operating fluid for the clutches. Each pump has one member secured for rotation with the housing and another member secured for rotation with respective rear wheel drive axles. An inlet of the pumps is controlled by a solenoid operated valve which is energized in response to an anti-lock brake system and traction control system of the vehicle. When energized, the valve connects the pumps to a reservoir such that fluid in the reservoir can be pumped to the clutches to enforce engagement thereof resulting in a drive path to the rear wheels.

6 Claims, 2 Drawing Sheets

US 6,186,258 B1

DYNAMIC ALL WHEEL DRIVE

TECHNICAL FIELD

This invention relates to all wheel drive powertrains and more particularly to such drives having a control element to disconnect the all wheel drive from one pair of driving wheels.

BACKGROUND OF THE INVENTION

Many modern vehicles employ four wheel drive systems. These systems have been marketed in two forms. Systems generally termed four wheel drive (4WD) have a transfer case which is controlled by the operator to select two wheel or four wheel drive. If the operator selects the four wheel drive condition, the vehicle drives all four wheel continuously. Some of these systems have employed overrunning clutches at two of the wheel to alleviate some of the disadvantages of 4WD which result from tire pressure differential and cornering to name a few.

All wheel drive (AWD) systems also provide the benefits of a four wheel drive vehicle and do not require the operator to intentionally select this condition. These systems often employ a viscous clutch in the center differential to transfer torque to the drive wheels that are not sensed as slipping. In tight cornering situations and during towing, these AWD systems present a disadvantage. The vehicle must be placed on a flat-bed type towing vehicle to prevent overheating of the powertrain during towing. In cornering situations, noise and vibration can result from the AWD system being engaged. While this is not detrimental to the powertrain during short durations, it can be disconcerting to the operator.

SUMMARY OF THE INVENTION

It is an object of the present invention to provide an improved all wheel drive powertrain.

In one aspect of the present invention, a powertrain has a pair of fluid operated clutch mechanisms which are engaged to connect drive axles to a drive shaft. In another aspect of the present invention, a fluid pump is employed to selectively engage each of the clutches. In yet another aspect of the present innovation, a control valve is disposed in fluid communication between each pump and a reservoir from which the pumps draw fluid.

In still another aspect of the present invention, the control valve is normally closed preventing pressurization of the clutches and thereby disconnecting the all wheel drive. In yet still another aspect of the present invention, the control valve is a solenoid controlled valve which receives operating signals from a vehicle traction control system. In a further aspect to the present invention, the operating signal is also dependent on an anti-lock brake system of the vehicle.

In one embodiment of the present invention, a front wheel drive system is continuously drivingly connected with the front wheels of a vehicle.

A transfer gear arrangement is driven by the differential output of the front wheel drive system. A rear drive shaft is driven by the transfer gear arrangement which in turn drives a clutch housing and a first member of each of a pair of positive displacement pumps. A pair of rear drive axles are rotatably supported in the clutch housing and drivingly attached to respective drive wheels.

A pair of fluid operated selectively engageable multi-disc type clutches are supported in the clutch housing. A first set of the discs are splined or otherwise drivingly connected with the clutch housing. A second set of the discs are interspersed with the first set and are drivingly connected with respective ones of the drive axles. A second member of respective ones of the pumps is connected to respective ones of the drive axles. The pumps are operable to supply pressurized fluid from a reservoir to apply pistons of the clutches respectively.

The pumps must have a differential rotation between the first and second members and have the inlets thereof connected with the reservoir. A solenoid controlled valve is disposed between the reservoir and the inlet of the pumps to establish fluid communication therebetween. The vehicle is equipped with an anti-lock brake control system (ABS) and a traction control system (TCS). The solenoid valve responds to operating signals from ABS/TCS to open the valve and permit fluid communication between the pump inlet and the reservoir.

As is well-known with TCS equipped vehicles, the ABS/TCS issue command signals when the drive wheels and the vehicle speed are not in agreement. When a command signal is issued, the solenoid valve is energized. Thus the pumps only pump fluid when the ABS/TCS recognize the front drive wheels and the vehicle speed are not in unison. This permits the rear wheels to be free from drive connections during certain vehicle maneuvers, such as cornering, and during vehicle towing when the front wheel are removed from ground contact.

DESCRIPTION OF AN EXEMPLARY EMBODIMENT

Figure 1:
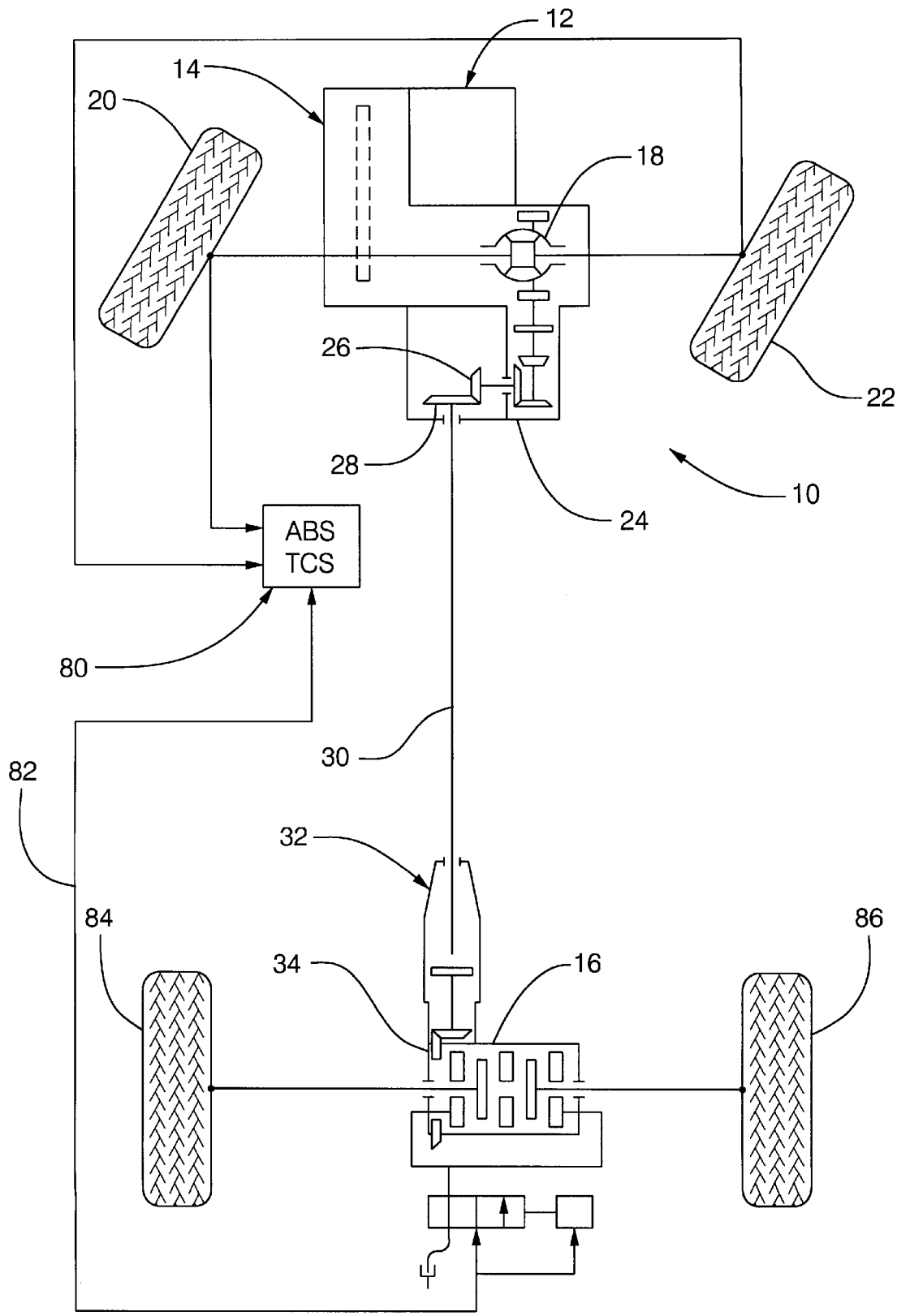
FIG. 1 is a diagrammatic representation of a vehicle powertrain incorporating the present invention.

Referring to the drawings, particularly FIG. 1, there is shown a vehicle powertrain, generally designated 10. The powertrain 10 includes an engine 12, a transmission and torque converter 14 and a rear drive mechanism 16. The transmission has an output differential 18 which is drivingly connected with a pair of front drive wheels 20, 22 and also drivingly connected with a transfer gear arrangement 24. The gear arrangement 24 has an output bevel gear 26 which is in mesh with a bevel gear 28. The bevel gear 28 is connected with a rear drive shaft 30 which is rotatable mounted in a housing 32 and drivingly connected with a hypoid pinion gear 34, shown in FIG. 2.

Figure 2:
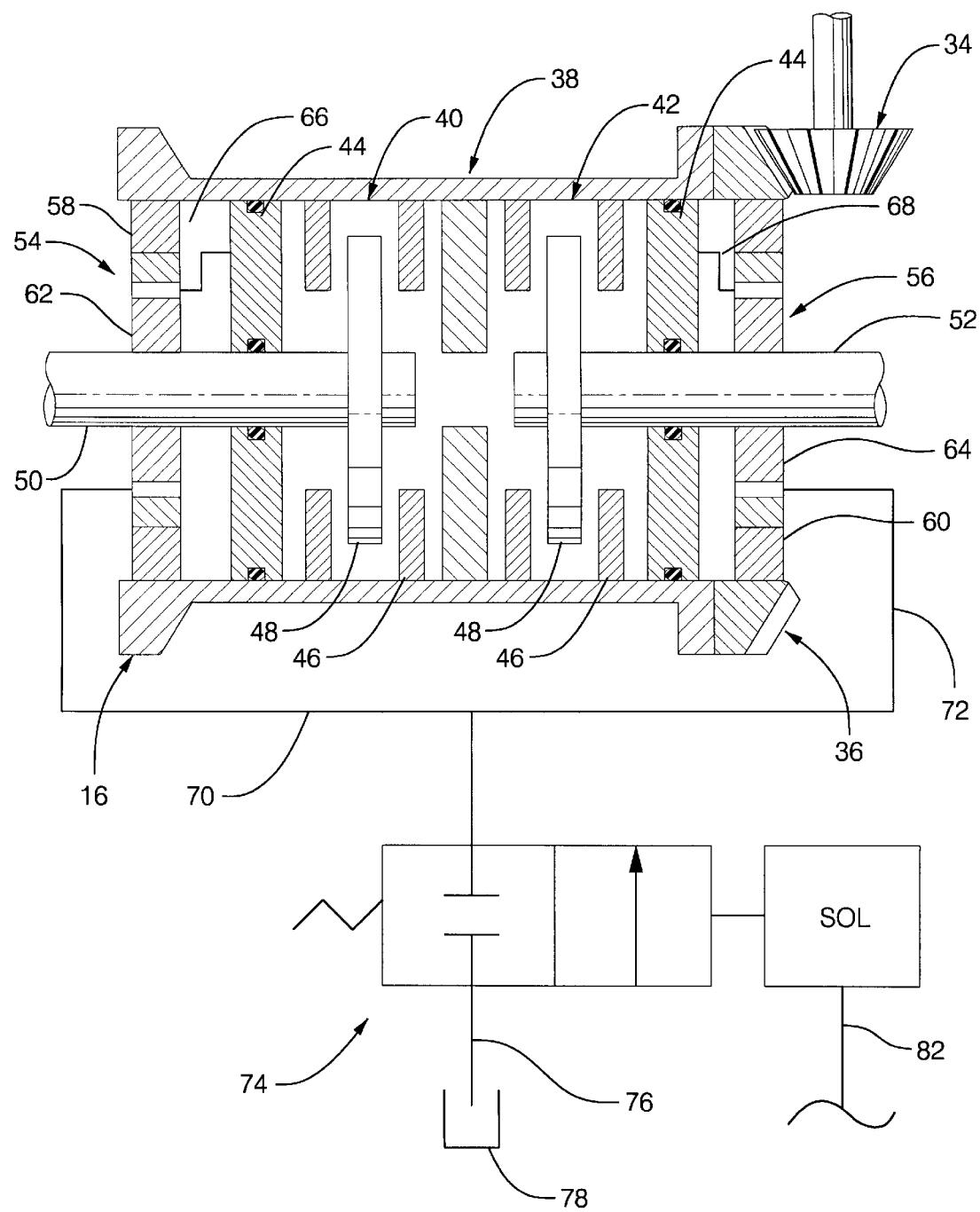
FIG. 2 is a diagrammatic representation of a rear drive mechanism employed in the powertrain of FIG. 1.

As best seen in FIG. 2, the pinion gear 34 is disposed in mesh with a hypoid ring gear 36 that is secured to a housing 38 in the rear drive mechanism 16. A pair of fluid operated friction clutches 40, 42 are disposed in the housing 38. The clutches 40, 42 are identical in construction and each has an apply piston 44 slidably contained in the housing 38. Each clutch has a plurality of friction discs or plates 46, splined to the housing 38 and 48 splined to respective axle shafts 50, 52. The clutch 40, when engaged, will connect the axle shaft 50 with the housing 38 and the clutch 42, when engaged, will connect the axle shaft 52 with the housing 38.

A pair of positive displacement hydraulic pumps 54, 56 are disposed in the housing 38 adjacent the clutches 40 and 42 respectively. The pumps 54 and 56 are preferably of the gerotor type. That is each pump 54 and 56 has an outer housing and a pair of rotatable meshing gear members. One gear member 58, 60 of each pump 54, 56 is rotatable supported in the housing 38 and the other gear member 62, 64 of each pump is drivingly connected with respective axle shafts 50 and 52. Each pump 54, 56 has an output passage 66, 68 which communicates with the pistons 44 of the respective clutches 40, 42 and an inlet passage 70, 72 which communicates with a solenoid operated control valve 74. Since each pump 54, 56 has one pumping element driven by the housing 38 and the other pumping element driven by the respective axle shafts 50, 52, the pumps 54, 56 will only deliver pressurized fluid when a speed differential between the housing 38 and the axles 50, 52 is present.

The solenoid control valve 74 is a two position valve, having a spring set position and a solenoid set position. The valve 74 has an inlet passage 76 which communicates with a reservoir 78. In the spring set position shown, the valve 74 prohibits communication between the reservoir 78 and the pumps 54, 56. In the solenoid set position, the valve 74 permits communication between the reservoir 78 and the pumps 54, 56. The solenoid valve 74 receives control signals from an anti-lock brake system/traction control system (ABS/TCS) 80 through a cable 82.

As is well known, the ABS/TCS 80 is active when the wheels of the vehicle are rotating at a speed differential relative to the vehicle speed. This can occur during braking, or traction loss at the drive wheels. In the present invention, a signal is issued to the solenoid valve 74 by the ABS/TCS 80 when the front drive wheels have reduced traction.

During normal operation, the valve 74 is in the spring set position such that the pumps 54 and 56 are disconnected from the reservoir 78. Also during normal operation with straight ahead driving, the housing 38 and the axle shafts 50 and 52 rotate in unison. However during a cornering maneuver, the axle shafts 50 and 52 will have a rotational speed differing from the speed of the housing 38; but the pumps cannot deliver pressurized fluid to the pistons 44 because they are disconnected from the reservoir 78. This prevents the AWD from operating during normal cornering. If the front wheels lose traction, the ABS/TCS 80 will issue a signal to the solenoid valve 74, and the valve 74 will move to the solenoid set position. This will connect the pumps 54, 56 with the reservoir 78. A differential speed between the housing 38 and the axles 50, 52 will result in the pumps 54, 56 delivering pressurized fluid to the pistons 44 and the clutches 40, 42 will be engaged. With the clutches 40, 42 engaged, the rear wheels 84, 86 of the vehicle will be driven.

With the present invention, the AWD system is only actuated when the ABS/TCS 80 senses a reduction in traction at the front wheels. Thus the system does not respond to a speed differential the might occur during cornering or tire inflation differential or the use of a spare tire. Also, the vehicle can be towed in the manner usually employed with front drive systems.

It will be appreciated by those skilled in the art that the solenoid used with the valve 74 can be of any type including but not limited to a pulse width modulated type or a variable bleed type and that the valve may be disposed between the pumps 54, 56 and the clutches 40, 42. Under this arrangement the pumps 54 and 56 are continually connected with the reservoir and open to the clutches 40 and 42 only when a loss of traction is sensed at the ABS/TCS 80.

What is claimed is:

1. An all wheel drive and control mechanism in a vehicle having an anti-lock brake system, a traction control system and a continuous drive mechanism connected with a first pair of drive wheels comprising;

a second pair of drive wheels having a first axle and a second axle;

a transfer mechanism including a housing connected with the continuous drive mechanism;

a first fluid operated selectively engageable clutch mechanism operatively connectable between said housing and said first axle;

a second fluid operated selectively engageable clutch mechanism operatively connectable between said housing and said second axle;

a first pump mechanism operatively connected between said housing and said first axle for delivering pressurized fluid to said first clutch mechanism when a speed differential is present between said housing and said first axle;

a second pump mechanism operatively connected between said housing and said second axle for delivering pressurized fluid to said first clutch mechanism when a speed differential is present between said housing and said second axle; and solenoid controlled valve means disposed between said first and second pump mechanisms for controlling a fluid connection between said pumps and a fluid reservoir, said solenoid valve having a normally closed position to prevent fluid communication and being controlled to an open position to allow fluid communication in response to a control signal from the anti-lock brake system and the traction control system.

2. The all wheel drive mechanism defined in claim 1 wherein said control signal is available when the anti-lock brake and traction control systems are activated by a traction reduction at the first pair of drive wheels.

3. The all wheel drive mechanism defined in claim 1 further comprising: a fluid operated apply piston in each of said clutch mechanisms and said pumps supplying pressurized fluid to said respective ones of said apply pistons when said solenoid valve is in the open position.

4. The all wheel drive mechanism defined in claim 2 further comprising: a fluid operated apply piston in each of said clutch mechanisms and said pumps supplying pressurized fluid to said respective ones of said apply pistons when said control signal is available.

5. An all wheel drive and control apparatus for a vehicle powertrain having a pair of normally driven wheels and a pair of normally undriven wheels comprising:

a housing driven in unison with the normally driven wheels;

a reservoir for storing hydraulic fluid;

first and second selectively engageable fluid operated clutch means disposed between said housing and the normally undriven wheels each including a pump having a fluid inlet, a fluid outlet, a first portion driven by said housing, and a second portion rotating with said normally undriven wheels, said pumps being effective to supply fluid pressure to engage said clutch means when said pumps are selectively connected with said reservoir; and a control valve member disposed in fluid flow relation between said reservoir and said inlet of said pumps and being responsive to a loss of traction at said normally driven wheels to connect said reservoir with said pumps only during said loss of traction.

6. An all wheel drive and control apparatus for a vehicle powertrain having a pair of normally driven wheels and a pair of normally undriven wheels comprising:

a housing driven in unison with the normally driven wheels;

first and second selectively engageable fluid operated clutch means disposed between said housing and the normally undriven wheels each including a pump having, an inlet, an outlet, a first portion driven by said housing, and a second portion rotating with said normally undriven wheels, said pumps being effective to selectively supply fluid pressure to engage said clutch means;

a reservoir for storing hydraulic fluid; and a control valve mechanism disposed in fluid flow relation between said reservoir and said inlet of said pumps and being responsive to a loss of traction at said normally driven wheels to selectively connect said pumps with said reservoir to deliver pressurized fluid to said clutch means only during said loss of traction.

* * * * *